March 17, 1959   D. R. MERRIL   2,878,405
COMMUTATOR CONSTRUCTION
Filed Jan. 18, 1957
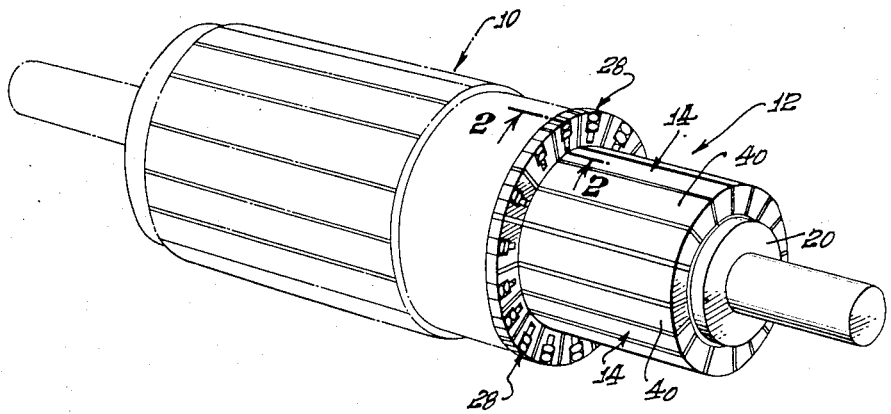
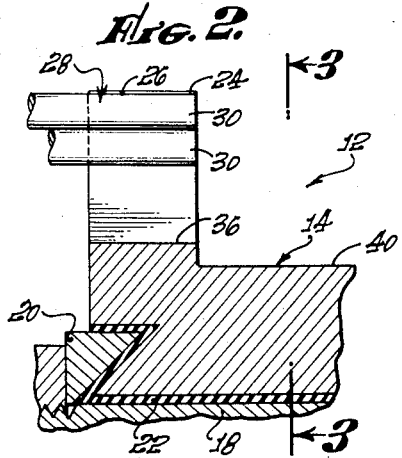
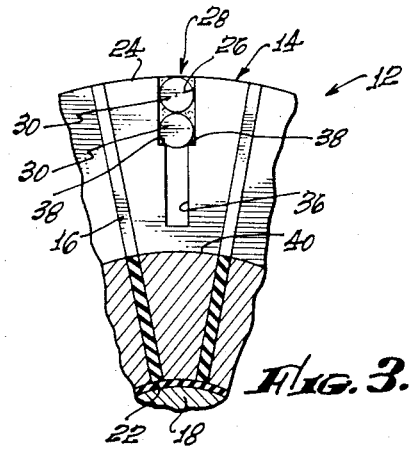
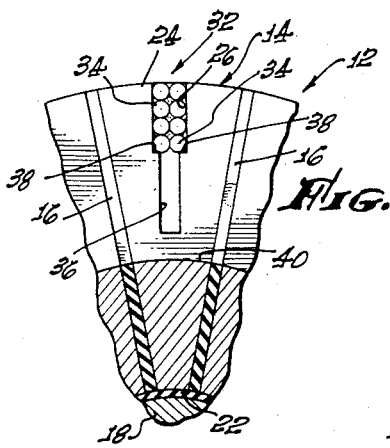
DALE R. MERRIL,
INVENTOR.
BY HIS ATTORNEYS:
HARRIS, KIECH, FOSTER & HARRIS

United States Patent Office 2,878,405
Patented Mar. 17, 1959

2,878,405

COMMUTATOR CONSTRUCTION

Dale R. Merril, North Hollywood, Calif., assignor to General Metals Corporation, San Francisco, Calif., a corporation of California Application January 18, 1957, Serial No. 634,894

1 Claim. (Cl. 310—234)

The present invention relates in general to direct current armatures and, more particularly, to commutators, a primary object of the invention being to provide a commutator construction which permits brazing or welding of the armature wires to the commutator bars, or, more specifically, to risers integral with the commutator bars, without detrimental annealing of the commutator bars proper, i. e., the portions of the commutator bars which form the brush track, without damage to the insulation between the commutator bars, and the like.

As is well known in the art, commutator bar risers are provided with wire slots extending radially inwardly from the peripheries thereof, the wire slot in each riser receiving one or more wires, hereinafter referred to as a wire group, bonded to the riser. In many instances, the groups of wires in the wire slots are bonded to the corresponding risers by soldering at relatively low temperatures. However, bonding of the groups of wires to the risers by soldering is not satisfactory where the armatures are required to operate at extremely high temperatures, such as those frequently encountered by direct current aircraft motors at the present time. Such motors frequently must operate at temperatures such that ordinary silver-lead solders crystallize and are thrown radially outwardly under the influence of centrifugal force.

In cases where such high temperature operation is required, it is necessary to braze or weld the groups of wires to the risers to obtain satisfactory bonds. However, in commutator structures where the risers are inegral wih the bars proper, the high temperatures required for such welding or brazing operations in accordance with prior practices result in excessive heating of the portions of the commutator bars forming the brush track. This frequently results in such undesirable effects as detrimental annealing of the commutator bars proper, deterioration of the insulation therebetween, and the like.

In view of the foregoing, the primary object of the invention is, as hereinbefore suggested, to provide a commutator structure which permits brazing or welding of the groups of wires to risers integral with the commutator bars without the undesirable effects inherent in prior practices.

More particularly, an important object of the invention is to provide each riser with a radial air slot located radially inwardly of and communicating with the wire slot in such riser. Such air slots minimize heating of the commutator bars proper in three ways. First, the presence of the air slot results in dissipation of some of the brazing or welding heat into the air in such slot. Second, the reduction in the cross sectional area of the riser resulting from the presence of the air slot therein reduces the conduction of brazing or welding heat to the portion of the corresponding commutator bar which forms a part of the brush track. Third, since the presence of the air slot in each riser reduces the amount of metal which must be heated during the brazing or welding operation, the amount of heat which must be applied for such operation is reduced, thereby further reducing the transmission of heat to the commutator bar proper.

Another object of the invention is to provide air slots which are narrower than the wire slots so as to provide wire supporting shoulders at the bottoms of the wire slots, i. e., at their junctions with the air slots. With this construction, the groups of wires may merely be dropped into the wire slots and they will be supported by such shoulders during the brazing or welding operation, there being no necessity for any auxiliary wire supporting means, which is an important feature.

Another object is to provide air slots which are narrower than and radially aligned with the wire slots so as to provide a wire supporting shoulder on each side of each wire slot at the junction thereof with the corresponding air slot.

Another object is to provide a commutator structure wherein the product of the total cross-sectional area of each riser on both sides of the air slot therein and the current carrying capacity of the riser material per unit of area is at least equal to the product of the total cross-sectional area of the group of wires in the corresponding wire slot and the current carrying capacity of the wire material per unit of area. This insures providing the risers with current carrying capacities at least equal to the current carrying capacities of the wire groups.

Another object is to provide an air slot width not more than about seventy percent of the wire slot width. This insures an adequate current carrying capacity for the risers and insures the provision of wire supporting shoulders of sufficient width.

While the present invention may be applied to a wire diameter of one-half the wire slot width so that each group of wires includes a plurality of pairs of side-by-side wires, I prefer to employ wires of a diameter substantially equal to the wire slot width and disposed in the wire slots in radially extending single files, this being another object of the invention. Such a wire arrangement permits the use of large diameter wires, which is desirable since it facilitates the brazing or welding operation, there being little possibility of burning the wires under such circumstances. Also, using fewer wires of large diameter increases the cross sectional area of the wires in the group with the result that heat dissipation from the brazing or welding zone is further increased.

The foregoing objects, advantages, features and results of the present invention, together with various other objects, advantages, features and results thereof which will be apparent to those skilled in the art in the light of the following detailed description, or which are inherent in the original claim hereinafter presented, may be attained with the exemplary embodiments of the invention hereinafter described and illustrated in the accompanying drawing, in which:

Fig. 1 is a perspective view of an armature incorporating the commutator construction of the invention;

Fig. 2 is an enlarged, fragmentary sectional view taken along the arrowed line 2—2 of Fig. 1;

Fig. 3 is a fragmentary sectional view taken along the arrowed line 3—3 of Fig. 2; and Fig. 4 is a fragmentary sectional view similar to Fig. 3, but illustrating an alternative embodiment of the invention.

Referring to the drawing, the numeral 10 designates an armature which includes a commutator 12 of the invention. As is well known in the art, the commutator 12 includes a plurality of circumferentially arranged commutator bars 14 separated by insulating layers 16 and held on a mandrel 18 by lock rings 20, the commutator bars being separated from the mandrel and the lock rings by an insulating layer 22.

The commutator bars 14 include integral risers 24 respectively provided with radial wire slots 26 extending inwardly from the peripheries thereof and receiving groups 28 of wires or bars 30 bonded or fused to the risers. The diameter of the wires 30 is shown as substantially equal to the width of the wire slots 26 so that the groups 28 comprise radially extending single files of wires. However, as shown in Fig. 4, each wire slot 26 may contain a group 32 of bars or wires 34 of a diameter substantially equal to one-half the width of the wire slot so that group 38 consists of a radially extending double file of wires. While the present invention is applicable either to a wire diameter substantially equal to the wire slot width, or to a wire diameter equal to substantially one-half the wire slot width, the former is preferred for reasons which will be considered hereinafter.

The present invention provides each riser 24 with an air slot 36 disposed radially inwardly of the corresponding wire slot 26 and communicating with the bottom of such wire slot. Each air slot 36 is narrower than the corresponding wire slot 26 and is in radial alignment therewith so as to provide at the junction of the two slots two wire supporting shoulders serving as seats for one of the wire groups 28, or one of the wire groups 32.

When assembling the armature 10, the wire groups 28, or the wire groups 32, are dropped into the respective wire slots 26 and seat on the shoulders 38, which support the wire groups in the wire slots during bonding of the wire groups to the risers 24. The presence of the air slots 36 radially inwardly of the wire slots 26 permits the use of high temperature brazing or welding operations in bonding the wire groups to the risers so that the resulting commutator 12 is capable of operating at much higher temperatures than commutators wherein the wire groups are soldered to the riser. More particularly, the air slots 36 permit high temperature brazing or welding operations without deleterious effects on brush-track-forming portions 40 of the commutator bars 14, on the insulating layers 16 and 22, and the like, by reducing the amount of the brazing or welding heat which is transmitted to such components, and by localing the brazing or welding heat around the wire groups 28 and wire slots 26. In other words, the reduction in heat transmission resulting from the presence of the air slots 36 prevents detrimental annealing of the track-forming portions 40 of the commutator bars 14, prevents deterioration of the insulating layers 16 and 22, and the like.

The air slots 36 reduce heat transmission to the track-forming portions 40 of the commutator bars 14 by the risers 24 in several ways. First, some of the brazing or welding heat is dissipated directly into the air in the slots 36. Second, the air slots 36 reduce the cross sectional area of the risers 24 available to conduct heat to the portions 40, thereby reducing the transmission of heat to such portions. Third, since the air slots 36 reduce the amount of metal present in the risers 24, the brazing or welding operations may be carried out with reduced applications of heat. The net result is that the air slots 36 permit the use of high temperature brazing or welding operations without undesirable effects on various components of the commutator 12, which is an important feature of the invention.

The width of the air slot 36 must be sufficiently less than the width of the wire slots 26 that the product of the total cross sectional area of each riser 24 on both sides of the air slot 36 therein and the current carrying capacity of the riser metal per unit of area is at least equal to the product of the total cross-sectional area of the wires 30 or 34 in the corresponding wire slot 26 and the current carrying capacity of the metal of the wires per unit of area. Thus, the current carrying capacity of the portions of each riser 24 on opposite sides of the air slot 36 therein is at least equal to the current carrying capacity of the wires 30 or 34 in the corresponding wire slot so that the presence of the air slot does not impair the current carrying capacity of the riser relative to the associated wires.

Also, the width of each air slot 36 must be sufficiently less than the corresponding wire slot 26 to provide shoulders 38 of sufficient width to serve as seats for one of the wire groups 28, or one of the wire groups 32. By making the width of each air slot 36 not more than about seventy percent of the width of the corresponding wire slot 26, the requirements of adequate current carrying capacity and of adequate wire supporting shoulder width are both met, which is an important feature of the invention.

Preferably, the air slot depth is made as large as possible consistent with maintaining adequate structural strength for the commutator bars 14, the greater the depth of the air slot, the greater the insulating effect of the air therein.

As previously mentioned, the use of the wires 30 of a diameter substantially equal to the wire slot width is preferred, there being two reasons for this. First, such larger diameter wires are easier to braze or weld to the risers 24 without burning through the wires. Secondly, the group 28 of wires 30 has a larger total cross sectional area than the corresponding group 32 of wires 34 so that the wires 30 are more effective in conducting heat away from the brazing or welding zone, which further tends to prevent heat transmission to the track-forming portions 40 of the commutator bars 14. However, smaller wires such as the wires 34 may be utilized with the present invention.

Although exemplary embodiments of the present invention have been disclosed herein for purposes of illustration, it will be understood that various changes, modifications and substitutions may be incorporated in such embodiments without departing from the spirit of the invention as defined by the claim which follows.

I claim as my invention:

A commutator comprising a plurality of circumferentially arranged metal commutator bars respectively having integral risers each provided with a radial wire slot in the periphery thereof and a radial air slot radially inwardly of and communicating with said wire slot, said air slots in said risers being narrower than said wire slots and providing wire supporting shoulders at their junctions with said wire slots, said air slots extending inwardly from said wire slots throughout a major portion of the distance from said shoulders to the periphery of said commutator bars and being of a width of at least about half the width of said wire slots but not exceeding about 70% thereof whereby wire may be welded or brazed in said wire slots at very high temperatures without undue conduction of heat to said commutator bars.

References Cited in the file of this patent

UNITED STATES PATENTS

| | | |
|---|---|---|
| 751,440 | Adams | Feb. 9, 1904 |
| 2,387,885 | Davis | Oct. 30, 1945 |
| 2,755,395 | Kilner | July 17, 1956 |